Dec. 29, 1942.    J. H. BENSON    2,306,772
SHEET AND TUBE EVAPORATOR
Filed March 12, 1940    5 Sheets-Sheet 1

Inventor
John H. Benson
By Freast and Bishop
Attorneys

Inventor
John H. Benson
By Frease and Bishop
Attorneys

Inventor
John H. Benson

Dec. 29, 1942.    J. H. BENSON    2,306,772
SHEET AND TUBE EVAPORATOR
Filed March 12, 1940    5 Sheets-Sheet 4

Inventor
John H. Benson
By Frease and Bishop
Attorneys

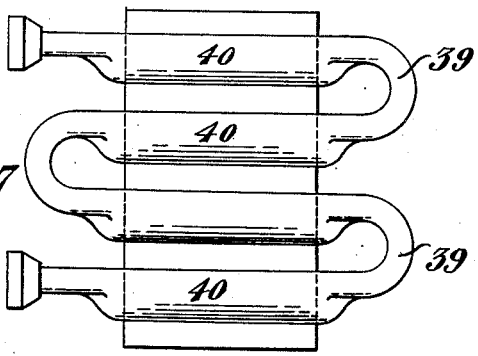
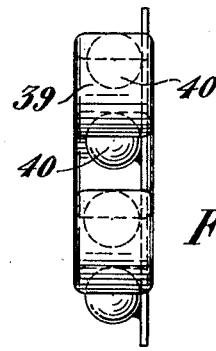
Fig.17  Fig.17a
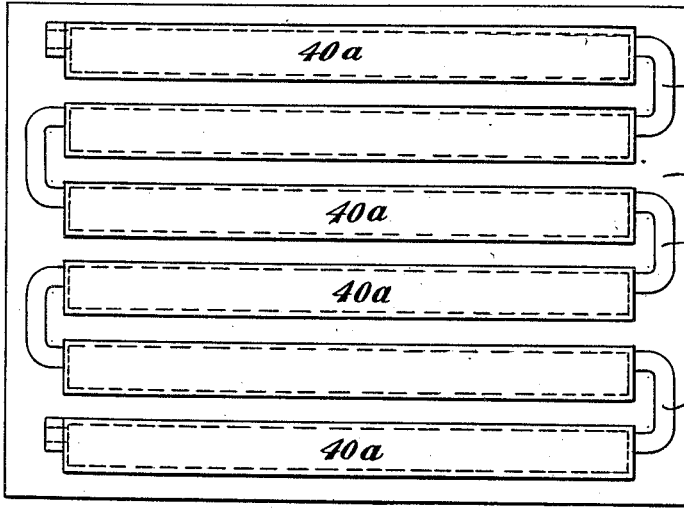
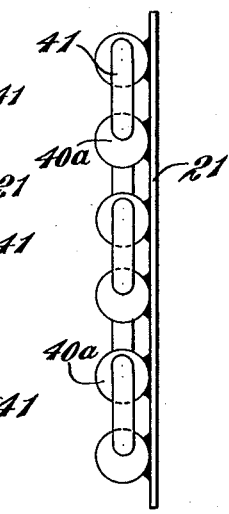
Fig. 18  Fig.18a
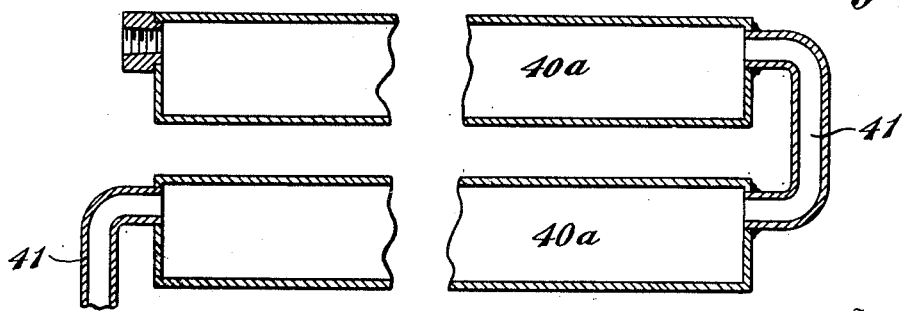
Fig. 19
Inventor
John H. Benson
By Frease and Bishop
Attorneys Patented Dec. 29, 1942

2,306,772

UNITED STATES PATENT OFFICE 2,306,772

SHEET AND TUBE EVAPORATOR

John H. Benson, Salem, Ohio, assignor to Mullins Manufacturing Corporation, Salem, Ohio, a corporation of New York Application March 12, 1940, Serial No. 323,540

5 Claims. (Cl. 62—126)

My invention relates to improvements in evaporators for refrigerating apparatus, adaptable to a wide variety of materials and permitting an unlimited range of designs with a minimum of die expense necessary to produce various models in quantity production; this application being a continuation in part of my copending application for Refrigerating apparatus, filed February 3, 1937, Serial No. 123,892.

The appearance and performance of the improved evaporator can be favorably compared to the two piece sheet metal evaporators, as well as to extruded metal evaporators now in use.

The objects of this invention are as follows:

1. To provide a low cost evaporator;
2. To provide a simple design adaptable to all kinds of ferrous and non-ferrous metals;
3. To provide a construction adaptable to either dry, flooded or semi-flooded evaporators of practically any shape;
4. To provide an evaporator whose tool up charge is nominal;
5. To provide an evaporator to be made in the flat with minimum distortion of refrigerant passages when bent to shape;
6. To permit simple, common methods to be used in attaching refrigerant conduits to walls of the evaporator, by using standard equipment;
7. To permit directional flow of refrigerant and gases from inlet to outlet so as to avoid superheated gas pockets and provide for maximum turbulence of the refrigerant.

These and other objects are attained by the construction and arrangement of a single wall sheet and a single refrigerant tube thereon, and the modified forms thereof, which are illustrated in the accompanying drawings, in which Figure 1 is a perspective of one preferred form of the evaporator, with a shelf therein, showing in a general way a capillary tube for controlling the flow of liquid refrigerant to the evaporator and a surge tank in the refrigerant outlet tube, which may be used with the evaporator;

Figs. 17 and 17a are side and end views respectively, illustrating the manner of forming an extended refrigerator surface evaporator from a length of tubing by making portions thereof oval in shape;

Figs. 18 and 18a are side and end views respectively, of a modified form of evaporator wherein the continuous passageway is formed by large diameter tubes connected together by smaller U tubes; and Fig. 19 is an enlarged longitudinal section of the two top refrigerant chambers shown in Figs. 18 and 18a.

Similar numerals refer to similar parts throughout the drawings.

Figure 1:
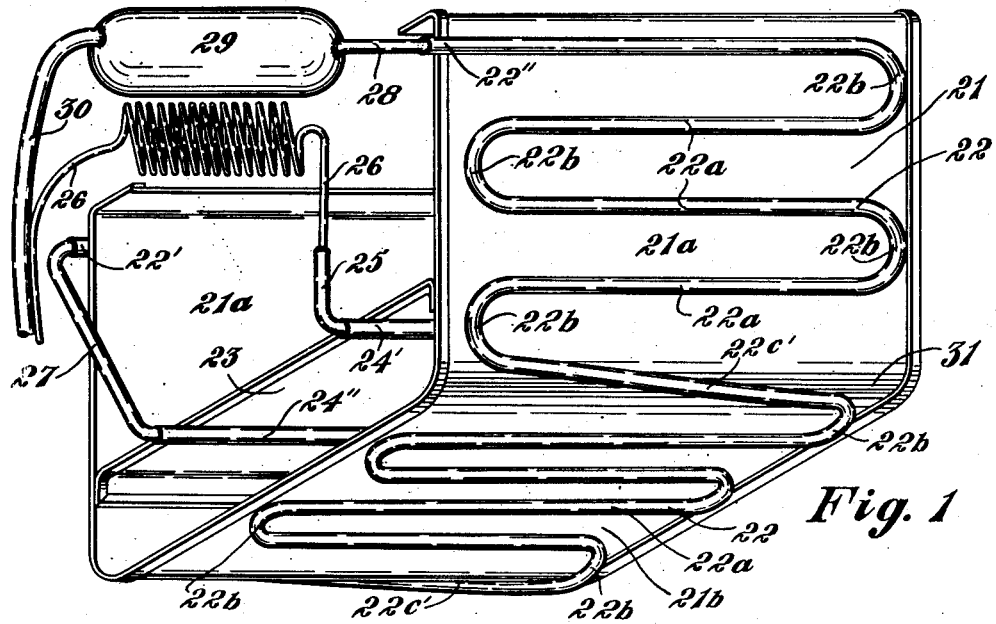
Figure 11:
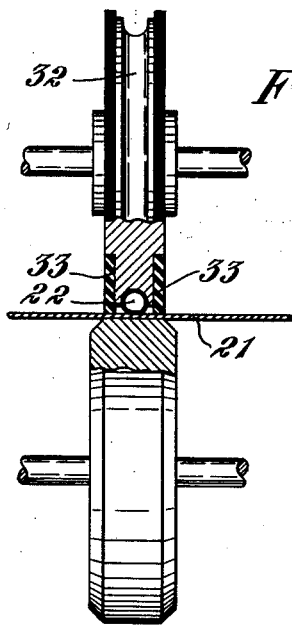
Fig. 11 is an elevation, partly in section, of the method and apparatus used for welding a tube on a metal sheet by electric resistance by seam rolls.
Figure 12:
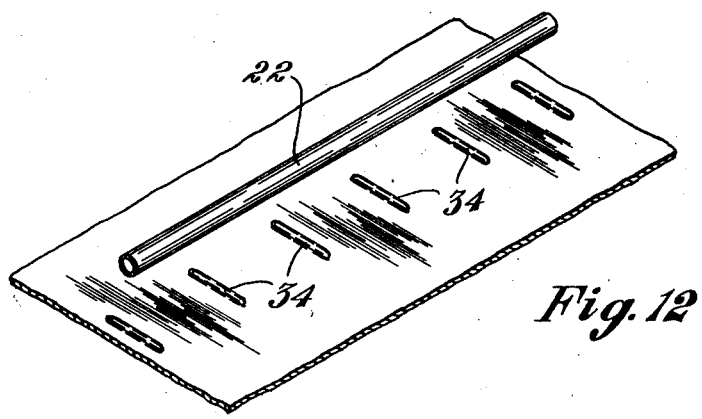
Fig. 12 is a fragmentary perspective, showing projections on a sheet for welding to a tube.
Figure 13:
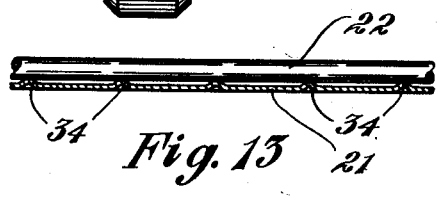
Fig. 13 is a fragmentary section, showing a tube on the sheet projections.
Figure 16:
Fig. 16 is a fragmentary section, showing the tube after being welded to the sheet by projections thereon.

The simplest form of the improved evaporator is illustrated in Fig. 1, and consists of a single sheet of metal 21 upon which a pre-formed coil of tubing 22 is superimposed. The tubing may be secured to the sheet by electric resistance welding, either by seam welding as shown in Fig. 11 or by projection welding as shown in Figs. 12 to 16 or by brazing as shown in Figs. 17 to 18a, or by any other suitable means.

This form of evaporator can be provided with a shelf 23 having a coil on its underside, one end 24' of which coil may be connected by an adapter 25, to a capillary tube 26 for controlling liquid refrigerant from a condenser, not shown; and the other end 24" of the shelf coil may be connected by an extension 27 with the inlet end 22' of the main coil on the evaporator, the outlet end 22" of which may be connected by an extension 28 with a tank 29, from which the refrigerant is withdrawn through a suction tube 30 leading to a compressor, not shown. If the refrigerated shelf is not used, a capillary tube 26 is connected directly to the inlet end 22' of the main coil.

Figure 2:
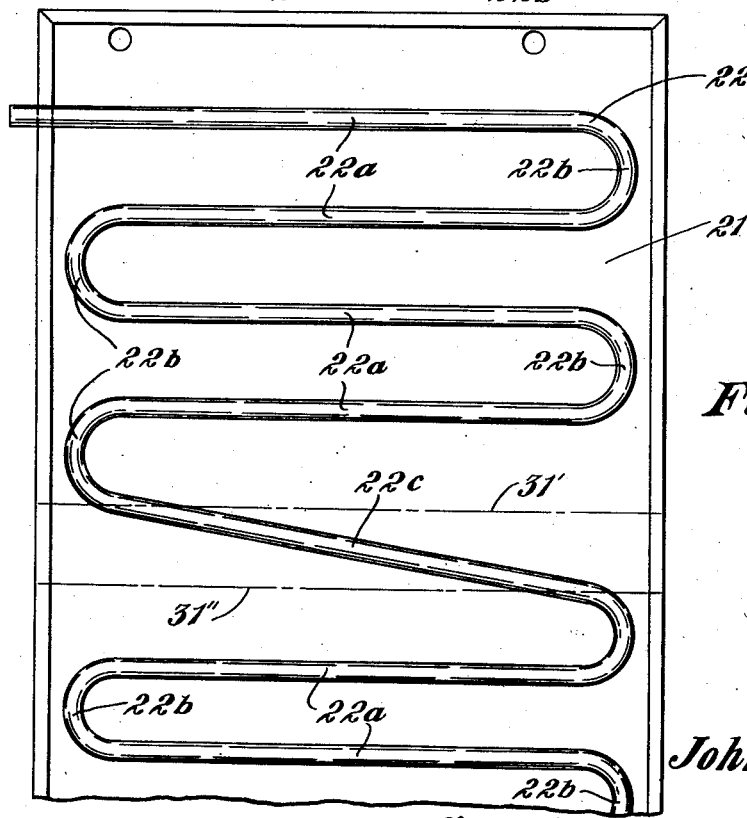
Fig. 2 is a plan of one end portion of the single sheet with the refrigerant tube thereon, in the flat form before bending.

The tubular coil 22 is preferably formed with alternating straight sections 22a to extend horizontally lengthwise from the front to the rear of the evaporator, the same being connected by curved coplanar sections 22b at the ends of the straight sections. The coil is secured to the sheet in the flat form as shown in Fig. 2, but may be applied thereto after the sheet is bent transversely to form side walls and a bottom wall at angles to each other. In either event the sheet is bent around a relatively short radius to form a curved corner area 31 extending along the sheet when it is bent between the lines 31' and 31" in the flat sheet. The corresponding straight section of the tube 22c is inclined so as to extend lengthwise and along the area of the bend, thus torsionally twisting the tube and giving it a gradual substantially helical bend 22c' in passing around the curved corner, and preventing a reduction of its cross area which occurs when a tube is bent directly around a short radius bend.

All of the straight sections 22a of the tubular coil on an upright wall 21a and also on the bottom wall 21b of the evaporator, preferably extend substantially horizontally for providing a gradual descent or ascent of the refrigerant in the upright walls, and preventing the trapping of gas pockets which often occurs when portions of refrigerant tubes are vertical, as in circling an evaporator wall or in extending upward and downward thereon. This arrangement permits a free escapement of gas toward the highest point of the evaporator and in the general direction in which the refrigerant flows through the evaporator coil.

The simplest form of evaporator shown in Fig. 1 may be used as a dry coil evaporator by substituting a conventional expansion valve, not shown, for the capillary tube 26, and omitting the tank 29; but it can be readily converted into a semi-flooded evaporator by the use of the capillary tube 26 and the tank 29, as shown in Fig. 1.

When the tube 22 is fused to the sheet by electric resistance seam welding, as shown in Fig. 11, it is necessary to provide means for preventing the pressure of the seaming roll from unduly distorting the tube; and for that purpose it is preferred to provide a peripherally grooved seaming roll 32 with non-conducting flat ring flanges 33 on the sides of its periphery, so proportioned as to tread upon the sheet 21 and to limit the pressure of the roll to such a degree as may be necessary for seam welding the tube to the sheet without unduly distorting the tube.

Figure 14:
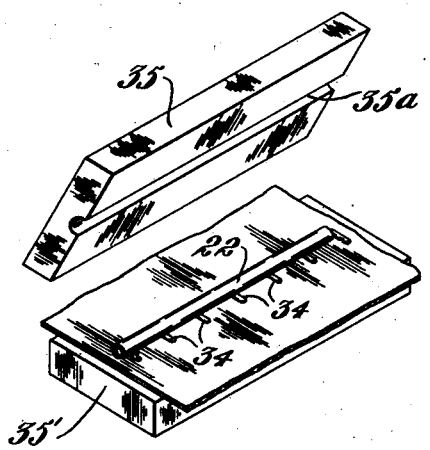
Fig. 14 is a diagrammatic perspective, showing dies for pressing and welding the tube on and to the sheet projections.
Figure 15:
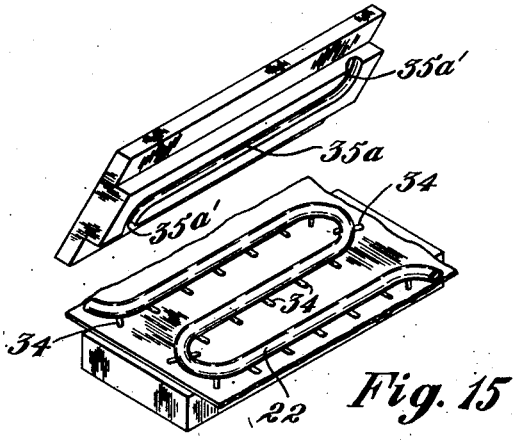
Fig. 15 is a diagrammatic perspective, showing a die for pressing and welding a half of one coil to projections on a sheet.

When the tube 22 is fused to the sheet by electric resistance projecting welding, it is necessary to provide suitable projections on the sheet for certainly seating the tube thereon; and for that purpose it is preferred to stamp a series of laterally extended projections 34 upon which the tube is pressed by dies 35 and 35' for welding the tube in thermal contact with the sheet, one die 35 being provided with a groove 35a for properly aligning the tube, as shown in Fig. 14. By providing such projections on the sheet for the curved sections of the tube, and forming the die groove 35a with reversely curved ends 35a, the curved sections of the tube as well as the straight sections thereof can be welded to the sheet, as shown for one of such dies in Fig. 15.

Figure 3:
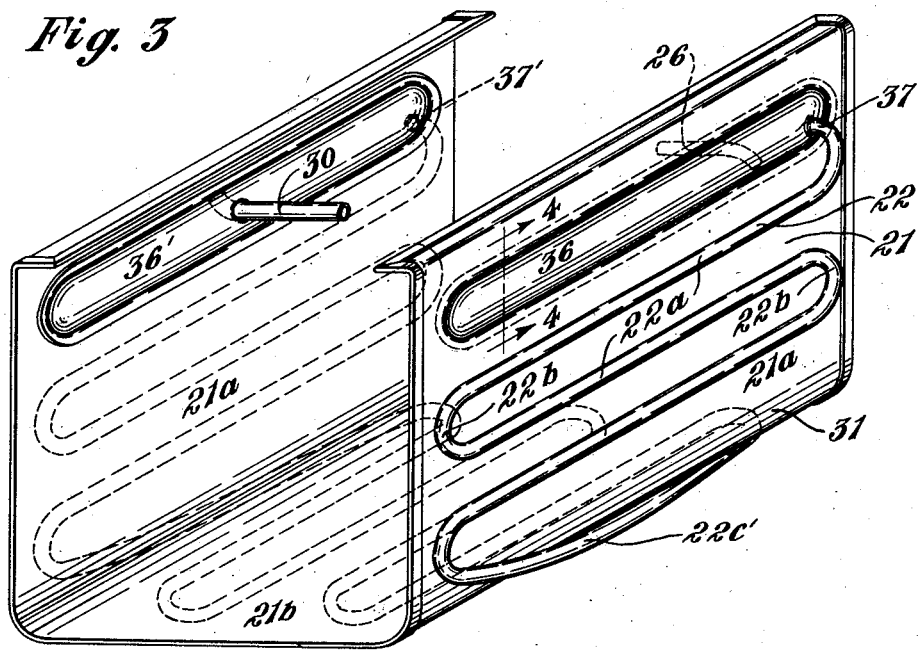
Fig. 3 is a perspective of a modified form of evaporator, showing the use of inlet and oulet headers in opposite side walls thereof.

In the modified form of evaporator shown in Fig. 3, a horizontal header is provided in the upper part of each side wall, one of which headers 36 receives liquid refrigerant through an inlet tube 26 from a suitable source, and delivers the same to the inlet end of the main coil as at 37, and the other header 36' receives the refrigerant from the outlet end of the main coil as at 37'. This header is connected with the usual suction tube 30 which withdraws the vaporized gas therefrom.

Figure 4:
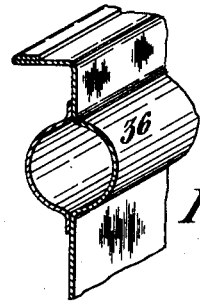
Fig. 4 is a cross section in plane in lines 4—4, Fig. 3.
Figure 6:
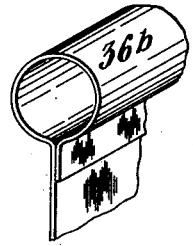
Figs. 5, 6, 7 and 8 are modified methods of making the headers from a single sheet wall.
Figure 8:
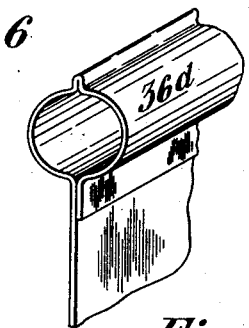
Figure 5:
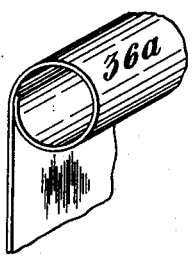
Figure 7:
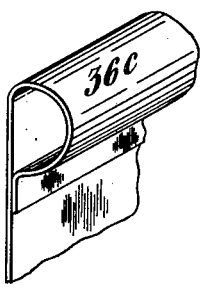

Fig. 4 is a section of the header 36 shown in Fig. 3, and Figs. 5, 6, 7 and 8 show several methods of bending by which headers, as 36a, 36b, 36c and 36d, respectively, may be formed from the single sheet wall of an evaporator.

Figure 9:
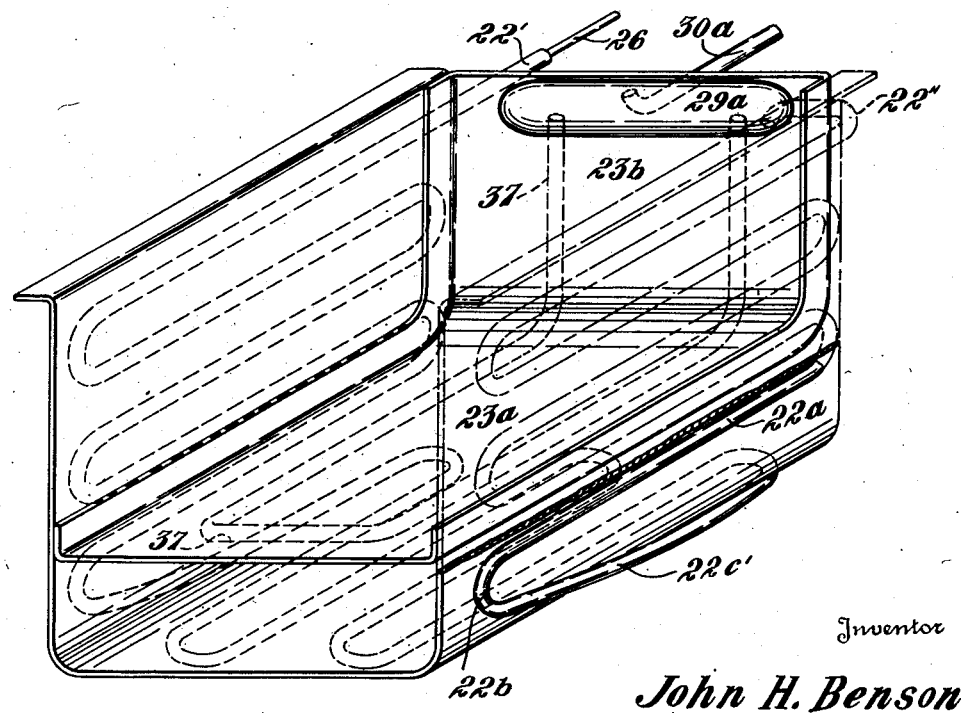
Fig. 9 is a perspective of another modified form of evaporator showing a shelf therein with a surge tank having a depending coil for the shelf.

In the modified evaporator shown in Fig. 9, the shelf 23a is bent upward to form the rear wall 23b, in the upper end of which wall is provided a horizontal header which can be used as a surge tank 29a, from which a depending tubular coil 37 may extend downward and forward along the rear side and under the bottom of the shelf. This surge tank 29a may be formed by stamping a semi-circular cavity with peripheral flanges welded to the rear wall of the shelf to complete a liquid and gas chamber 29a. This chamber may be formed in any one of the methods shown in Figs. 4 to 8. The liquid refrigerant may be admitted by the capillary tube 26 into the inlet end 22' of the main coil, and is delivered from the outlet end 22" thereof into the adjacent end of the surge tank 29a; whence the refrigerant may flood the shelf coil 37, and the vaporized refrigerant may be withdrawn from the liquid and gas chamber by the usual suction tube 30a as shown in Fig. 9.

Figure 10:
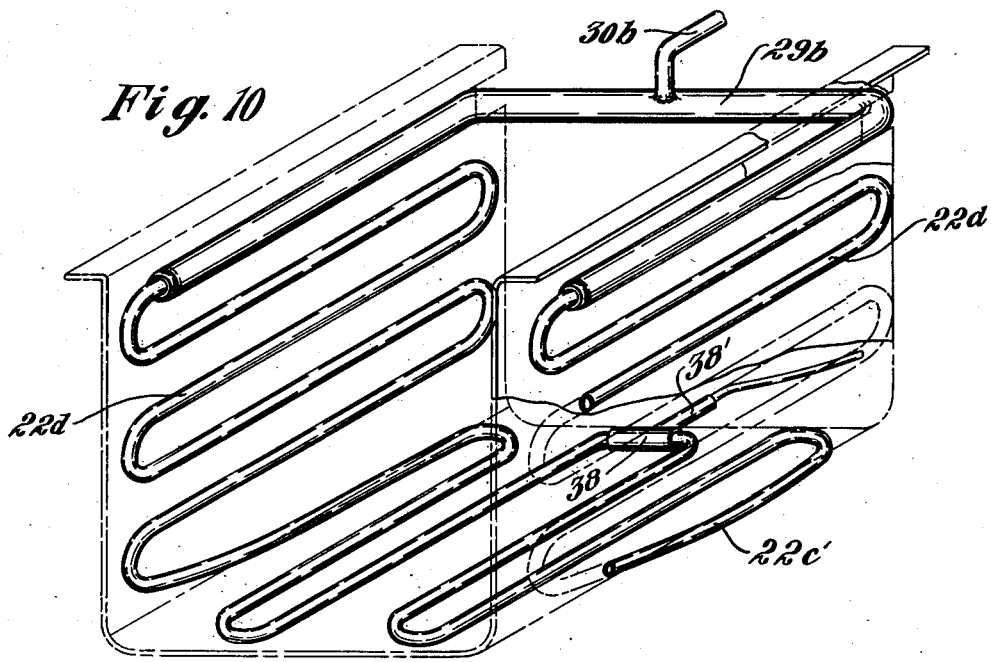
Fig. 10 is a perspective of another modified form of evaporator, showing a common inlet at the bottom of two parallel refrigerant conduits, and a common outlet tube at the top thereof.

In the modified evaporator shown in Fig. 10, a tubular T fitting 38 is inserted in the middle of the bottom coil, and through the stem 38' thereof refrigerant is received from a conventional metering device, whence the refrigerant flows outward and upward on each side of the evaporator through the divisions 22d of the main coil; and is discharged into the respective ends of a larger diameter U-shaped tube 29b which is provided around the top of the side and rear of the evaporator and forms a liquid and gas chamber, from the middle of which chamber the vaporized refrigerant is withdrawn through the usual suction tube 30b.

Figs. 17 and 17a illustrate a manner of fabricating an extended refrigerant surface evaporator section from relatively large diameter tubing. Portions of the tubing, as at 39, are flattened out, or formed in oval shape, to define refrigerant reservoirs 40; the flattened portions 39 being so formed as to lead into the top portion of the reservoir 40.

The modification illustrated in Figs. 18, 18a and 19 is similar to that disclosed in Figs. 17 and 17a, except that the refrigerant reservoirs 40a are formed of lengths of relatively large diameter tubing connected by smaller U tubes 41, the larger tube lengths 40a being suitably welded to a base or support member 21.

These modified forms and arrangements of the refrigerant tubing may be used for accomplishing the results set forth in my copending application for Refrigerating apparatus, filed February 3, 1937, Serial No. 123,892, to which reference is made without repetition herein.

The sheet and tube evaporator in its various forms, lends itself to a wide variety of materials, from the lower price steel to the higher price stainless steels. A few of such combinations are mentioned, as follows:

1. Steel sheet and steel tube (Bundy), finished by hot dip galvanizing and applying baked aluminum synthetic finish on top of the galvanizing.
2. Zinc coated sheet with tinned (Bundy) tubing. Can be finished with baked aluminum synthetic.
3. Zinc coated sheet with tinned copper tubing or aluminum tubing.
4. Coated or uncoated copper sheet with coated or uncoated copper tubing. Uncoated material to be subsequently finished with the electro or hot dipped tin.
5. Brass, aluminum, or other non-ferrous sheets, with copper or aluminum tubing. Electric resistance welding or brazing can be used to secure the tube to the sheet.
6. Stainless steel sheets with tin coated copper tubing or aluminum tubing. Any one of the three methods of attaching tube to sheet can be used, except possibly the electric resistance welding of aluminum to the stainless.
7. Stainless steel sheet and stainless steel tubing. Any method of welding the tube to the sheet can be used, and no final finish would be required other than an acid dip finish.

In this manner, the present invention provides for the manufacture of very low cost evaporators from various kinds of metal sheets and tubes for use in different refrigeration systems; provides an evaporator construction which requires only simple and inexpensive sheet and tube bending tools and welding or brazing equipment; and provides an evaporator construction which may utilize relatively thin walled metal sheets and tubes thereby reducing the metal weight and cost thereof.

In the foregoing description, certain terms have been used for brevity, clearness and understanding; but no unnecessary limitations are to be implied therefrom beyond the requirements of the prior art, because such words, in being used for descriptive purposes and not for the purpose of limitation, are intended to be broadly construed.

Moreover, the invention is not limited to the exact structures shown herein, because the sizes, shapes and relative locations of the various parts may be varied to provide other structural embodiments without departing from the scope of the present invention.

The words "relatively thin walled" used herein and in the claims as applied to sheets or tubes, are intended to include sheet metal or tubes having a wall which may be as thin as 0.020" or thinner for sheets and as thin as 0.028" or thinner for tubes.

Having now described the features of the invention, the construction, manufacture and use of preferred forms of the same, and the advantages and results obtained by the improved construction; the new and useful inventions, constructions and devices, and reasonable mechanical equivalents thereof obvious to those skilled in the art are set forth in the appended claims.

I claim:

1. A refrigerant evaporator having a side wall and a transverse bottom wall bent laterally from the side wall, and a metal tube coil on the side and bottom walls having substantially horizontal straight sections extending lengthwise thereof and an inclined torsionally twisted section extending lengthwise substantially helically along and around the bend.

2. A refrigerant evaporator having a side wall and a transverse bottom wall bent laterally from the side wall, and a metal tube coil welded on the side and bottom walls having substantially horizontal straight sections extending lengthwise thereof and an inclined torsionally twisted section extending lengthwise substantially helically along and around the bend.

3. A refrigerant evaporator having adjacent walls angularly bent from each other, and a metal tube coil thereon having an inclined torsionally twisted section extending lengthwise substantially helically along and around the bend.

4. A refrigerant evaporator formed from a single sheet of relatively thin metal, and a coil of relatively thin walled metal tubing formed to lie in one plane, the sheet of metal and the coiled tube being fused together along all straight sections of said coiled tubing, and the sheet bent to form a sharp freezing chamber or chambers with the tube having inclined torsionally twisted sections extending lengthwise substantially helically along and around the corner bends of the sheet.

5. In a sheet metal refrigerant evaporator, a sheet metal member having a side wall portion connected by an angular bend around a corner with a bottom wall portion, said member being provided with a tubular passageway having an inclined torsionally twisted section extending lengthwise substantially helically along and around the corner bend.

JOHN H. BENSON.